United States Patent Office 3,142,652
Patented July 28, 1964

3,142,652
POLYMERIC ELASTOMERS PREPARED FROM ISO-
CYANATE - MODIFIED POLYESTERS, SOLU-
TIONS THEREOF AND METHODS FOR THEIR
PREPARATION
Henry A. Pace, Akron, Ohio, assignor to The Goodyear
Tire & Rubber Company, Akron, Ohio, a corporation
of Ohio
No Drawing. Filed Aug. 3, 1959, Ser. No. 831,056
20 Claims. (Cl. 260—22)

This invention relates to solid cured polymeric elastomers, to their preparation and to solutions of these elastomers. More particularly, it relates to cured solid polymeric elastomers prepared from isocyanate-modified polyesters, to methods of preparing them and to solutions of these elastomers.

It has been proposed by a number of workers to prepare polymeric elastomers by the isocyanate modification of polymeric materials that contain active hydrogen atoms (as measured and determined by the Zerewitinoff method), particularly polyesters. It is the active-hydrogen atoms of these polyesters that react with the isocyanate groups to form networks of long, crosslinked molecular chains. For example, in "Rubber Chemistry and Technology" for October-December 1950, at pages 812–834 is described a type of isocyanate-modified polyester that is a liquid reaction mixture which, after preparation, must be immediately poured or cast into a mold of the desired shape whereupon it hardens into a solid polymeric elastomer. This type of polyurethane (as the products of these isocyanate-modified active-hydrogen-containing polymeric materials are known) has certain disadvantages, e.g., it must be kept dehydrated to prevent the formation of bubbles in the final cast material and it must be cast into its desired shape immediately after preparation, before it "sets up." In U.S. Patent 2,764,-565 is described a particular sheet or coating type of polyurethane. This material also must be put into its final desired shape or configuration immediately as it "sets up." In U.S. Patents 2,625,532; 2,625,535 and 2,777,831 is described a processible, storable, solid elastomer. However, this material must have incorporated into it just before use, some further isocyanate or other curative by some means such as mill mixing before it can be fully utilized as a finished product.

Still another type of polyurethane product that has proved to be very useful is one which is used to coat objects such as fabric, paper and the like. However, such coatings have heretofore been a partially isocyanate-modified polyester. For example, a "prepolymer" (as such partially isocyanate-modified, active-hydrogen-containing materials are called) was applied to the web to be treated and then the remainder of the "curing" isocyanate was applied or, in another embodiment, a one-solution coating was employed, in which the "prepolymer" was mixed with the "curing" isocyanate just previous to application. Such one-solution coating materials had very short storage life before the solution "sets up" to a solid material.

Still other types of polyurethanes can be formed such as those disclosed in British Patent 761,426 wherein the polyurethane film is formed from polyesters and 4,4' diisocyanatodiphenyl methane and allowed to be cured by exposure to water vapor at critical elevated temperatures.

It is, therefore, an object of this invention to provide a cured polyurethane product which will exhibit superior physical properties without the disadvantages of having to immediately cast it into its desired shape or configuration. Another object is to provide a cured polyurethane product which does not require that the "curing" isocyanate be added just prior to use. Still other objects are to provide methods of producing cured polyurethane materials that are soluble in certain selected solvents. Other objects are to provide solutions of cured polyurethane materials that may be utilized at any time to obtain finished products, due to the stability of the solutions of this invention. Still another object is to provide a stable "one-solution" coating composition of polyurethane material with indefinite "pot life." Still another object is to provide polyurethanes which do not have to be exposed to the curing step after a structure is formed from them. Still other objects of this invention are to provide products from materials having low cost and high availability. Other objects and advantages will become apparent as the description proceeds.

According to the invention, liquid mixtures of linear polyesters prepared from dihydric alcohols and dicarboxylic acids and having molecular weights ranging from about 1700 to about 2100 are reacted with water in the amount of from about 2.5 to 4.0 mols per mol of polyester and diisocyanate selected from the group consisting of 2,4 tolylene diisocyanate and mixtures of 2,4 and 2,6 tolylene diisocyanate, the 2,6 isomer being present to an extent of not more than about 10% of the total diisocyanate in the mixture, the total diisocyanate being present in an amount of at least 80 mol percent of the equivalent amount, the amount theoretically required to react with the "reactive groups" present in the polyester and the water, said reaction being carried out in the presence of the catalyst system comprising a mixture of (a) N-methyl morpholine and (b) a condensation product of 1 mol of aniline and 4 mols of n-butyraldehyde, each in an amount ranging from about 0.25 to 3.0 parts by weight per 100 parts of polyester, the total catalyst employed ranging from about 0.5 to not more than 3.25 parts by weight per 100 parts of polyester employed.

More particularly, the liquid reaction mixture of polyester, water, diisocyanate and catalyst is allowed to foam and the foam is destroyed while it is in a fluid, unstable state thereby converting the liquid reaction mixture to a pulverulent, solid, non-cellular elastomer. This is accomplished by means of a shearing action exerted upon the foaming liquid reaction mixture facilitating the release of carbon dioxide by destroying the cellular structure. The resulting elastomer is then heated at a time and temperature ranging from 1 hour at 100° C. to about 8 hours at 125° C. to effect the cure.

The term "reactive group" as employed in this application is meant to include both hydroxyl and carboxyl groups present in the substance described (usually the polyester and water).

While it is possible to employ mixtures of 2,4 and 2,6-tolylene diisocyanates wherein the 2,6 isomer may approach approximately 20% by weight of the total diisocyanate, it is preferred that no more than 10% of the 2,6 isomer be employed. The 2,6 isomer when it is employed in this invention at more than 10% by weight of the total tolylene diisocyanate tends to cause the resulting polyurethane to be only partially soluble. These partially soluble polyurethanes, while they are still useful for certain purposes, must be subjected to the extra step of filtration when employed as solutions, cast as films or extruded as filaments. It is also possible to prepare these soluble, fully cured elastomers by employing only one of the catalysts mentioned above, that is, one may employ either N-methyl morpholine alone or the condensation product of 1 mol of aniline and 4 mols of n-butyraldehyde alone in amounts ranging up to 3 parts per 100 parts of polyester, however, it is preferred to employ a mixture of the two catalysts in amounts up to 3.25 parts by weight. The polyurethane that is formed when only one catalyst is employed does not exhibit the most desirable properties. For instance, if the condensation product of 1 mol of aniline and 4 mols of n-butyraldehyde is the only catalyst employed in this reaction the resulting product tends to become sticky and has very high elongation and, if N-methyl morpholine is employed as the only catalyst, the resulting product tends to become much less soluble. It is believed this difference is due at least in part to the different functions which each of these catalytic materials performs. While the exact nature of each of these catalysts is not completely understood, it is believed that N-methyl morpholine tends to catalyze the formation of crosslinks in the reaction product of polyester, diisocyanate and water while the condensation product of 1 mol of aniline and 4 mols of n-butyraldehyde tends to catalyze the extension of this reaction to form somewhat linear polymers with very few crosslinks.

The polyesters useful in the practice of this invention are prepared by the condensation reaction between one or more glycols and one or more dibasic carboxylic acids. Normally the ratio of glycol to dibasic acid should be controlled so that there is an excess of glycol employed. This is done in order to obtain linear polyester chains containing a preponderance of terminal hydroxyl groups. Any glycol can be used in the preparation of these polyesters. Representative examples are ethylene glycol; propylene glycol; 2,3-, 1,3- and 1,4-butylene glycols; 2-methyl pentanediol-2,4; 2-ethyl hexanediol; 1,3-hexamethylene glycol; diethylene glycol; triethylene glycol and the polypropylene glycols. Any dibasic carboxylic acid can be used in the preparation of these polyesters. Representative examples are adipic, sebacic, malonic, suberic, succinic, maleic, fumaric and itaconic acids. The preferred polyesters are those prepared by reacting adipic acid with ethylene glycol, propylene glycol, diethylene glycol and/or the butylene glycols, the glycols being used singly or in mixtures of two or more, to give polyesters having a molecular weight ranging from about 1700 to about 2100. These polyesters should have hydroxyl numbers of from about 70 to 52 and acid numbers of less than 2, thereby exhibiting a preponderance of terminal hydroxyl groups.

The water used in the practice of this invention is considered to be a bifunctional crosslinking agent by virtue of the intermediate amines which are formed. The amount of water employed must range from 2.5 mols to 4.0 mols per mol of polyester used. If a lower amount of water is used, the finished product will be a soft, somewhat gummy, insufficiently cured elastomer and will not exhibit satisfactory physical properties. If more than 4.0 mols of water are used the elastomer formed will be a hard, highly crosslinked, less soluble product and again will not exhibit the optimum physical properties. Best results have been obtained when approximately 3.0 mols of water per mol of polyester are employed in the practice of this invention.

The tolylene diisocyanates useful in the practice of this invention are 2,4-tolylene diisocyanate and mixtures of 2,6-tolylene diisocyanate and 2,4-tolylene diisocyanate wherein the 2,6-isomer is limited to not more than 10% by weight of the mixture. If more than 10% by weight of the 2,6-isomer is used the resulting elastomer will tend to become insoluble and therefore tend to become an undesirable product. The preferred tolylene diisocyanate is 2,4-tolylene diisocyanate alone or in mixture with not more than 5% by weight of the 2,6-isomer.

The amount of tolylene diisocyanate employed in this invention is at least 80 mol percent of the amount theoretically required to react with all of the hydroxyl and carboxyl groups (reactive groups) present in the polyester and the water. While more than the theoretical amount may be employed, any amount in excess of the theoretical amount of isocyanate groups required to react with the "reactive groups" of the polyester and the water produces no further substantial improvement in the finished product to warrant the added cost of this excess amount of diisocyanate. Therefore, in practice, it is preferred to use from 80 to 100 mol percent of the theoretical amount. Any amount of diisocyanate which contains more than a 20% deficiency of isocyanate groups theoretically required to effect complete reaction with the "reactive groups," i.e. the hydroxyl and carboxyl groups, of the polyester and the water will produce a finished product which is too soft and gummy to exhibit satisfactory physical properties. The most preferred amount of tolylene diisocyanate in the practice of this invention is about 10% less than the number of isocyanate groups theoretically required to react with the hydroxyl and carboxyl groups ("reactive groups") of the polyester and the water or about 90 mol percent of the theoretical amount.

It is contemplated, in the scope of this invention, to include the formation of the polymers by means of a "prepolymer" preparation. The formation of polyurethane elastomers by means of "prepolymers" is not broadly new. To form a "prepolymer" from an active-hydrogen-containing polymeric material, such as a polyester, and a diisocyanate, one has only to add to the polyester an amount of diisocyanate calculated to react with the hydroxyl and carboxyl groups or "reactive groups" present in the polyester, taking care to exclude any moisture from the mixture. The formation of a "prepolymer" is, in effect, the extension of the polymeric chain to give long chain polymers consisting of an ordered polymer of alternate units of polyester nuclei and isocyanate nuclei connected by a urethane linkage.

The catalyst normally employed in the practice of this invention consists of a mixture of N-methyl morpholine and the condensation product of 1 mol of aniline and 4 mols of n-butyraldehyde. It is preferred to employ at least about 0.25 to about 3.0 parts by weight of each to obtain satisfactory products. However, due to the exothermic nature of the reaction it is also preferred to employ these two catalysts in amounts where they are in an amount totaling 3.25 parts by weight per 100 parts of polyester. Thus, it is suggested that one catalyst be employed in ranges from 0.25 to 3.0 while the other be employed in ranges from 3.0 to 0.25 parts by weight per 100 parts of polyester. The condensation product of one mol of aniline and four mols of n-butyraldehyde is further described in U.S. Patents 1,780,326 and 1,780,334. Best results have been obtained with these catalysts in amount of 0.7 part by weight of the condensation product of aniline and n-butyraldehyde and 0.5 part by weight of N-methyl morpholine per 100 parts by weight of polyester used.

Small amounts of material having more than two functional groups per molecule, such as castor oil or other tribasic compounds may be incorporated into the polyester used in the practice of this invention without adversely affecting the solubility, yet enhancing physical properties, particularly the tensile strength. Thus, it has been found that up to about 3 parts by weight of castor oil or other trihydric compounds may be added per 100 parts by weight of polyester used. This absence of effect upon the solubility of the cured elastomers when polyfunctional material is added is not fully understood, since one would be led to believe that a material having a functionality greater than two would tend to cause a greater amount of crosslinks to form and it would be likely that such a polymer would be insoluble.

The polymers produced in the practice of this invention are capable of having pigments, fillers, coloring agents and other compounding ingredients incorporated into them according to well-known practices. This can be done at any time or phase of the invention. These materials may be added to the polyester before the reaction has begun, while the polymer itself is being made by adding them to the mixture before the reaction is complete, or they may be incorporated into the solutions of the polymers while they are being made or after they are prepared and ready for use. For best results they are usually added while the polymers are being formed so as to obtain good dispersions of the pigments, fillers, etc. into the polymer itself.

In the preparation of the cured polymeric elastomers of this invention, it is desirable to make use of a sigma-type blade of internal mixer. One such mixer that has been found very effective is a Baker-Perkins mixer which has two counter rotating sigma-type blades that exert a high shearing action upon the material. The following procedure is recommended. The polyester is added to the mixer first; the required amount of tolylene diisocyanate is added to the polyester, one of the catalysts is added and mixed in and then the water followed by the second catalyst is added to this mixture, at which time the mixture begins to foam. This foam is destroyed by the shearing action of the sigma-type blades. The mixing is continued until a solid semicured elastomer has been formed, which has been reduced by the action of the rotating blades to very small lumps or even powder. These discrete particles or crumbs are easily removed from the mixer and are heated in an oven for approximately 1 hour at 100° C. to about 8 hours at 125° C. to complete the cure.

The products of this invention, although cured, can be dissolved to form solutions which may be utilized for casting, coatings, cements, and the like. The pulverulent products are particularly useful for this purpose.

Solvents which have been found to be particularly useful for forming solutions of these cured polyurethane elastomers are dimethyl formamide, dimethyl acetamide, dimethyl propionamide and dimethyl sulfoxide, or mixtures of these solvents. Whenever any of the first three mentioned solvents are used, a dissolution agent must also be used in the amount of from 0.1 to 1 percent by weight, based on the solvent. The most effective dissolution agent useful for this purpose is di-n-butylamine. However, it has been found that, when dimethyl sulfoxide is used as a solvent, it possesses a solvent power so great that no dissolution agent is necessary. It has also been found that if the products of this invention are dissolved in aforementioned solvents and cast into structures no further dissolution agent is required to be present in the solvent to redissolve this once cast product.

In forming the solutions of this invention, no special technique is required. Any method of preparing solutions of elastomers may be employed according to well-known practices. It is preferred, however, to use the pulverulent elastomers for this purpose. The solvent-elastomer mixture may also be heated to decrease the time required to prepare these solutions. In general, solutions up to 50% by weight solids content of elastomer in solvent can be prepared, with the solutions becoming more viscous as the solids content is increased. The particular solids content of the solutions of this invention may be prepared to comply with the specific use to which they are to be adapted. For instance, a particular solution found to be suitable for a brushing application has been found to be a 33⅓% by weight solids content of elastomer in solvent. It is normal practice to use a solution of higher solids content, i.e. about 40 or 45% solids, for a "doctor blade" spreading application and if a spraying application is required to use a lower solids content, i.e. about 25% solid content by weight. In a casting application it is desirable to use the highest possible solids content, i.e. 50% solids content by weight, of elastomer in the solvent. A particularly good application for the solution of this invention has been made by extruding these solutions through spinnerets to form elastomeric thread.

Further details of the practice of this invention are set forth in the following examples which are to be interpreted as representative rather than restrictive of the scope of this invention. In these examples wherein physical properties are reported, time is reported in minutes required to change the liquid reaction mixture to a solid elastomer. The solid elastomer was heated for an additional 60 minutes at 100° C. to complete the cure; ultimate tensile is reported in pounds per square inch of cross section required to break the test pieces and ultimate elongation is reported in percent increase in elongation at the break point of the test pieces. The test pieces were dried films cast upon a glass plate from approximately 33% by weight solutions of elastomer in a solvent consisting of dimethyl formamide which contained 1.0% di-n-butylamine by weight.

EXAMPLE 1

Into a suitable container was placed 900 grams of a polyester prepared from the condensation of approximately 1.1 mols of a mixed glycol of ethylene glycol, diethylene glycol, and butanediol-1,4 in equal molar quantities with approximately 1.0 mol of adipic acid. This polyester had an hydroxyl number of approximately 60 and an acid number of approximately 1 (resulting in a "reactive number" of 61) and a molecular weight of approximately 1800. To this polyester were added 92.7 grams of a mixture of 98 parts by weight of 2,4-tolylene diisocyanate and 2 parts by weight of 2,6-tolylene diisocyanate. This mixture was stirred for 36 minutes while being maintained at a temperature ranging from 60° C. to 63° C. (This partially diisocyanate-modified polyester is called a prepolymer.) To this prepolymer were added 222 grams of a mixture of 98 parts by weight of 2,4-tolylene diisocyanate and 2 parts by weight of 2,6-tolylene diisocyanate, and 13.5 grams of castor oil. The mixture was then transferred to a 2-quart Baker-Perkins sigma-blade mixer and 6.3 grams of catalyst (the condensation product of 1 mol of aniline and 4 mols of n-butyraldehyde) were added. After mixing for 4 minutes, 27.3 grams of water were added at which time the mixture began to foam, this foam was destroyed by the shearing action of the sigma blades. Some 3 minutes after the addition of the water, 5 cubic centimeters of N-methyl morpholine (another catalyst) were added. After this mixture had been allowed to mix for a period of approximately 20 minutes in the Baker-Perkins mixer, the formation of elastomer was observed. The mixing was continued for an additional 30-minute period, during which time the elastomer was reduced to a powdered form. This was done to allow ease of handling and removal of the elastomer from the mixer. This powdered elastomer was heated in a 100° C. oven for 60 minutes to complete the cure.

EXAMPLE 2

The procedure described in Example 1 was duplicated except that no castor oil was added to the polyester.

EXAMPLE 3

A mixture consisting of (A) 750 grams of a polyester resulting from the condensation of adipic acid with a mixture containing equimolar quantities of ethylene glycol, diethylene glycol and butanediol-1,4 and having a hydroxyl number of approximately 60, an acid number of approximately 1 and a molecular weight of approximately 1800, and (B) 259 grams of tolylene diisocyanate (98% of the 2,4-isomer and 2% of the 2,6-isomer) was placed in a Baker-Perkins mixer. To this mixture were added 11.2 grams of castor oil. After stirring for approximately 1 minute, 5.3 grams of catalyst (the condensation product of one mol of aniline and four mols of n-butyraldehyde) were added to the mixture. Three minutes later 22.7 grams of water were added, at which time the mixture foamed. The foam was destroyed by the shearing action of the sigma blades. After a short interval (approximately three minutes), 4.1 cubic centimeters of N-methyl morpholine were added. The foaming continued but was constantly suppressed by the action of the sigma blades. The maximum exothermic temperature reached during this reaction was 90° C. Twenty-four minutes after the reaction started the elastomer began to form, the mixing being continued to reduce the elastomer to a powder form. This powdered elastomer was placed in a 100° C. oven for 1 hour to complete the cure.

In Table 1 below are reported the physical properties of films cast from the polymers formed in Examples 1 through 3. The films were tested after aging for 2 days. The films of products of Examples 2 and 3 were again tested after aging for 2 months at room temperature.

*Table 1*

| Example | Aged 2 days | | Aged 2 months | |
|---|---|---|---|---|
| | Ultimate Tensile (p.s.i.) | Ultimate Elongation (percent) | Ultimate Tensile (p.s.i.) | Ultimate Elongation (percent) |
| 1 | 3,937 | 877 | | |
| 2 | 2,735 | 947 | 3,523 | 907 |
| 3 | 3,000 | 920 | 4,163 | 887 |

EXAMPLE 4

The procedure described in Example 1 was repeated except that the polyester was a condensation product of approximately 1.1 mols of a 80/20 molar ratio of ethylene glycol/propylene glycol with approximately 1.0 mol of adipic acid. This polyester had an hydroxyl number of approximately 58 and an acid number of less than 1 and a molecular weight of approximately 1900. The elastomer resulting from this example gave the following physical properties when a film cast from a solution of the elastomer was tested. The solvent used to form this solution was dimethyl formamide containing 1% by weight of di-n-butylamine. After the film had been aged at room temperature for two days the ultimate tensile strength was 3323 pounds per square inch and the ultimate elongation was 807%. A sample of this same film was aged at room temperature for 2 months and tested again. The ultimate tensile strength was 3270 pounds per square inch and the ultimate elongation was 730%.

While the following three examples are not illustrative of the preferred practice of this invention, they are included to illustrate that the resulting elastomers are only partially soluble in dimethyl formamide if the 2,6-isomer content of the mixed tolylene diisocyanate used in the preparation of these elastomers is more than 10% by weight of the total mixture of diisocyanates and completely insoluble if more than 20% of the 2,6-isomer is employed.

EXAMPLE 5

The same procedure was used as in Example 1 except that the tolylene diisocyanate was a mixture of 80% of the 2,4-isomer and 20% of the 2,6-isomer, by weight.

EXAMPLE 6

The same procedure was used as in Example 5 except that, instead of 13.5 grams, only 6.8 grams of castor oil were added to the polyester.

EXAMPLE 7

The same procedure was used as in Example 1 except that the tolylene diisocyanate used was a mixture of 48% of the 2,4-isomer and 52% of the 2,6-isomer, by weight.

Table 2 below summarizes the properties of the elastomers resulting from Examples 5 through 7.

*Table 2*

| Example | 2,4-/2,6- TDI Ratio | Reaction Time (Mins.) | Solubility in DMF [1] | Cast Film | |
|---|---|---|---|---|---|
| | | | | Ultimate Tensile (p.s.i.) | Ultimate Elongation (percent) |
| 5 | 80/20 | 24 | Fair [2] | 1,649 | 845 |
| 6 | 80/20 | 21 | Fair [2] | 2,030 | 833 |
| 7 | 48/52 | 20 | Insoluble | Could not be tested | |

[1] Dimethylformamide containing 1% di-n-butylamine.
[2] Solutions contained undissolved gel which was filtered out before films cast.

The following two experiments, while they do not illustrate the preferred practice of this invention, illustrate that polymer or elastomer may be formed using only one of the aforementioned catalysts.

EXAMPLE 8

The procedure according to Example 2 was performed except that the N-methyl morpholine was eliminated from the reaction mixture. This resulted in a product having low tensile strength, i.e. 1537 p.s.i.

EXAMPLE 9

The procedure according to Example 2 was repeated except that the condensation product of 1 mol of aniline with 4 mols of n-butyraldehyde was eliminated. This resulted in a product which was rather difficult to dissolve.

The following example illustrates a somewhat larger scale practice of this invention.

EXAMPLE 10

To a 50-gallon Baker-Perkins mixer, equipped with two counter-rotating sigma blades and a cooling water jacket, was added 60 pounds of a linear polyester prepared from the condensation of approximately 1.1 mols of a mixed glycol of ethylene glycol, diethylene glycol and butane-diol-1,4 in equal molar quantities with approximately 1.0 mol of adipic acid (having a hydroxyl number of approximately 60 and an acid number of aproximately 2, resulting in a "reactive number" of approximately 62). The mixer was started and 0.94 pound of castor oil and 21 pounds of 100% 2,4-tolylene diisocyanate were added (if pigments such as extenders or coloring agents are to be employed they may be added at this time). About 3 minutes were allowed to effect a uniform solution after which 0.437 pound of catalyst comprising a condensation product of 1 mol of aniline and 4 mols of n-butyraldehyde was added and the mixture allowed to continue stirring for approximately 3 minutes. Then to this mixture was added 1.89 pounds of water at which time some foaming was detected. After approximately 3 or 4 minutes, 0.318 pound of the other catalyst, N-methyl morpholine, was added. During the first minute after the addition of the second catalyst vigorous foaming was observed which then subsided and the reaction mixture became more and more viscous. After several minutes it was observed that the mixture had been transformed from a viscous liquid to a soft solid mass. Seventeen minutes after the addition of the N-methyl morpholine the mass began to crumble, as it was now converted to a solid elastomer. The solid elastomer was allowed to remain in the mixer 14 minutes to complete its conversion to crumb form. This material was cured at 125° C. in a hot air oven for varying lengths of time, each sample of which was formed into a 33⅓% solution in dimethyl formamide containing about 1.0% of di-n-butylamine, and solution viscosities determined. These 33⅓ solutions were then cast into films which were dried and the tensile and elongation determined. The results are given in a table below:

*Table 3*

| Cure, Hrs./125° C. | Viscosity (cps.) | Average Tensile (p.s.i.) | Average Elongation (Percent) |
|---|---|---|---|
| .5 | 3,000 | 2,565 | 927 |
| 1 | 8,500 | 3,619 | 820 |
| 2 | 12,300 | 4,186 | 880 |
| 3 | 13,600 | 4,559 | 872 |
| 4 | 14,800 | 4,207 | 860 |
| 5 | 17,000 | 4,922 | 900 |
| 6 | 15,000 | 4,434 | 843 |
| 7 | 14,000 | 4,529 | 882 |
| 8 | 14,000 | 4,000 | 875 |

While in the examples above certain specific amounts of certain specific materials are employed, satisfactory elastomers may be prepared by using polyesters prepared from the condensation of other glycols and mixtures of other glycols with other dibasic carboxylic acids or mixtures of other dibasic carboxylic acids following the general procedures outlined above, if the teachings (found elsewhere in this specification) as to the requirements of the polyesters are adhered to. Different amounts of the water, tolylene diisocyanate and catalyst as well as the ratios of 2,6 and 2,4-isomers of the tolylene diisocyanate may be employed to produce satisfactory elastomers using the general procedures outlined in the examples above, if care is taken to observe the general teachings of the amounts and other limitations of these materials that appear elsewhere in this specification.

This application is a continuation in part of my application Serial No. 675,561, filed August 1, 1957, now abandoned.

While certain representative embodiments and details have been shown for the purpose of illustrating the invention, it will be apparent to those skilled in this art that various changes and modifications may be made therein without departing from the spirit or scope of the invention.

What is claimed is:

1. A composition of matter which comprises a cured solid elastomer prepared by reacting a mixture of (A) linear polyesters prepared from dihydric alcohols and dicarboxylic acids and containing terminal hydroxyl groups and having molecular weights ranging from about 1700 to about 2100, (B) a trihydric compound in the amount of up to 3% by weight of polyester used, (C) water in the amount of from 2.5 to 4 moles per mole of polyester and (D) diisocyanate selected from the group consisting of 2,4-tolylene diisocyanate and mixtures of 2,4- and 2,6-tolylene diisocyanate in which the 2,6-isomer in said mixture is present to the extent of not more than 10 percent of the total diisocyanate in the mixture, the total diisocyanate being present in an amount of at least 80 mole percent of the equivalent amount required to react with the reactive groups present in the polyester and water, said reaction being carried out in the presence of a catalyst system comprising (a) N-methyl morpholine and (b) a condensation product of 1 mole of aniline and 4 moles of n-butyraldehyde, each in an amount ranging from about 0.25 to about 3 parts by weight per 100 parts of polyester, the total catalyst employed ranging from about 0.5 to not more than 3.25 parts by weight per 100 parts of polyester, allowing said mixture to foam and destroying the foam before the mixture is converted to a solid elastomer by means of a shearing action exerted upon the foaming mixture and allowing the evolution of carbon dioxide and heating the resulting elastomer to effect a complete cure.

2. A composition of matter according to claim 1 in which the water is present in an amount of approximately 3.0 moles per mole of polyester.

3. A composition of matter according to claim 1 in which the diisocyanate employed is 2,4-tolylene diisocyanate.

4. A composition of matter according to claim 1 in which the diisocyanate employed is a mixture of 2,4- and 2,6-tolylene diisocyanate, the 2,6-isomer in said mixture being present to the extent of not more than 5% of the total diisocyanate.

5. A composition of matter according to claim 1 in which the total diisocyanate is present in an amount of at least 90 mole percent of the equivalent amount required to react with the reactive groups present in the polyester and water.

6. A composition of matter according to claim 1 in which the amount of N-methyl morpholine is 0.5 part by weight and the amount of condensation product of 1 mole of aniline and 4 moles of n-butyraldehyde is 0.7 part by weight per 100 parts of polyester.

7. A composition of matter which comprises a cured solid elastomer prepared by the reaction of (A) linear polyesters prepared from dihydric alcohols and dicarboxylic acids and containing terminal hydroxyl groups and having molecular weights ranging from about 1700 to about 2100, (B) a trihydric compound in the amount of up to 3% by weight of polyester used, (C) water in the amount of from 2.5 to 4 moles per mole of polyester and (D) diisocyanate selected from the group consisting of 2,4-tolylene diisocyanate and mixtures of 2,4- and 2,6-tolylene diisocyanate in which the 2,6-isomer in said mixture is present to the extent of not more than 10 percent of the total diisocyanate in the mixture, the total diisocyanate being present in an amount of at least 80 mole percent of the equivalent amount required to react with the reactive groups present in the polyester and water, said reaction being carried out in the presence of a catalyst system comprising (a) N-methyl morpholine and (b) a condensation product of 1 mole of aniline and 4 moles of n-butyraldehyde, each in an amount ranging from about 0.25 to about 3 parts by weight per 100 parts of polyester, the total catalyst employed ranging from about 0.5 to not more than 3.25 parts by weight per 100 parts of polyester, allowing said mixture to foam, destroying the foam before the mixture is converted to a solid elastomer by means of a shearing action exerted upon the foaming mixture, allowing the evolution of carbon dioxide and heating the resulting elastomer to effect a complete cure, said elastomer being soluble in dimethyl formamide containing from about 0.1 to 1 percent by weight of di-n-butylamine.

8. A composition of matter which comprises a cured solid elastomer prepared by the reaction of (A) linear polyesters prepared from dihydric alcohols and dicarboxylic acids and containing terminal hydroxyl groups and having molecular weights ranging from about 1700 to about 2100, (B) a trihydric compound in the amount of up to 3% by weight of polyester, (C) water in the amount of approximately 3 moles per mole of polyester and (D) a mixture of 2,4- and 2,6-tolylene diisocyanate in which the 2,6-isomer is present to the extent of not more than 5% of the total weight of diisocyanate in the mixture, the total diisocyanate being present in an amount of at least 90 mole percent of the equivalent amount required to react with the reactive groups present in the polyester and water, said reaction being carried out in the presence of 0.7 part by weight of the condensation product of 1 mole of aniline and 4 moles of n-butyraldehyde and 0.5 part by weight of N-methyl morpholine per 100 parts of polyester, allowing said mixture to foam and destroying the foam before the mixture is converted to a solid elastomer by means of a shearing action exerted upon the foaming mixture and allowing the evolution of carbon dioxide and heating the resulting elastomer to effect a complete cure.

9. A process of preparing a cured solid elastomer which comprises reacting a mixture of (A) polyesters prepared from dihydric alcohols and dicarboxylic acids and containing terminal hydroxyl groups and having molecular weights ranging from about 1700 to about 2100, (B) a trihydric compound in the amount of up to 3% by weight of polyester, (C) water in an amount ranging from 2.5 moles to 4.0 moles per mole of polyester and (D) a diisocyanate selected from the group consisting of 2,4-tolylene diisocyanate and mixtures of 2,4- and 2,6-tolylene diisocyanate, the 2,6-isomer in said mixtures being present to the extent of not more than 10% of the total of said diisocyanates and the total diisocyanate being present in an amount of at least 80 mole percent of the equivalent amount required to react with the reactive groups present in the polyester and the water, said reacting mixture being in the presence of the catalyst system comprising (a) N-methyl morpholine and (b) a condensation product of 1 mole of aniline and 4 moles of n-butyraldehyde each in an amount ranging from about 0.25 to 3.0 parts by weight per 100 parts of polyester, the total catalyst employed ranging from about 0.5 to not more than 3.25 parts by weight per 100 parts of polyester, allowing the said mixture to foam and destroying the foam before the mixture is converted to a solid elastomer by means of a shearing action exerted upon the foaming mixture, allowing the evolution of carbon dioxide and heating the resulting solid, non-cellular elastomer to effect a complete cure.

10. A process according to claim 9 in which the water used is 3.0 moles per mole of polyester.

11. A process according to claim 9 in which the diisocyanate is 2,4-tolylene diisocyanate.

12. A process according to claim 9 in which the diisocyanate is a mixture of 2,4- and 2,6-tolylene diisocyanate, the 2,6-isomer in said mixture being present to the extent of not more than 5% of the total of said diisocyanate.

13. The process according to claim 9 in which the total diisocyanate is present in an amount of at least 90 mole percent of the equivalent amount required to react with the reactive groups present in the polyester and the water.

14. The process according to claim 9 in which the amount of N-methyl morpholine is 0.5 part by weight per 100 parts of polyester and the amount of a condensation product of 1 mole of aniline and 4 moles of n-butyraldehyde is 0.7 part by weight per 100 parts of polyester.

15. A process of preparing a cured solid elastomer which comprises reacting a mixture of (A) polyesters prepared from dihydric alcohols and dicarboxylic acids and containing terminal hydroxyl groups and having molecular weights ranging from about 1700 to about 2100, (B) a trihydric compound in the amount of up to 3% by weight of polyester, (C) water in an amount of 3.0 moles per mole of polyester and (D) a mixture of 2,4- and 2,6-tolylene diisocyanate, the 2,6-isomer in said mixture being present to the extent of not more than 5% and the total diisocyanate being present in an amount of at least 90 mole percent of the equivalent amount required to react with the reactive groups present in the polyester and water, the reaction taking place in the presence of 0.7 part by weight of the condensation product of 1 mole of aniline and 4 moles of n-butyraldehyde and 0.5 part by weight of N-methyl morpholine per 100 parts of polyester, allowing the said mixture to foam and destroying the foam before the mixture is converted to an elastomer by means of a shearing action exerted upon the foaming mixture, allowing the evolution of carbon dioxide and heating the resulting elastomer to effect a complete cure.

16. A solution of a cured solid elastomer resulting from the reaction of (A) linear polyester prepared from dihydric alcohols and carboxylic acids and containing terminal hydroxyl groups and having molecular weights ranging from about 1700 to about 2100 and (B) a trihydric compound in the amount of up to 3% by weight of polyester, (C) water in the amount of from 2.5 to 4 moles per mole of polyester and (D) a diisocyanate selected from the groups consisting of 2,4-tolylene diisocyanate and mixtures of 2,4- and 2,6-tolylene diisocyanate in which the 2,6-isomer is present to the extent of not more than 10% of the total weight of diisocyanate in the mixture, the total diisocyanate being employed in an amount of at least 80 mole percent of the equivalent amount required to react with the reactive groups present in the polyester and the water, said reaction being carried out in the presence of a catalyst system comprising (a) N-methyl morpholine and (b) a condensation product of 1 mole of aniline and 4 moles of n-butyraldehyde each in an amount ranging from 0.25 to 3.0 parts per 100 parts of polyester, the total catalyst employed ranging from about 0.5 to not more than 3.25 parts per weight per 100 parts of polyester, allowing said mixture to foam and destroying the foam before the mixture is converted to a solid elastomer by means of a shearing action exerted upon the foaming mixture and allowing the evolution of carbon dioxide, and heating the resulting elastomer to effect a complete cure, in a solvent selected from the group consisting of dimethyl sulfoxide, dimethyl formamide containing from 0.1 to 1% by weight of di-n-butylamine, dimethyl acetamide containing from 0.1 to 1% by weight of di-n-butylamine and dimethyl propionamide containing from 0.1 to 1% by weight of di-n-butylamine.

17. A solution according to claim 16 in which the water is present in an amount of 3.0 moles per mole of polyester.

18. A solution according to claim 16 in which the diisocyanate is a mixture of 2,4- and 2,6-tolylene diisocyanate, the 2,6-isomer in said mixture being present to the extent of not more than 5% of the total weight of the diisocyanate in the mixture.

19. A solution according to claim 16 in which the solvent is dimethyl sulfoxide.

20. A solution according to claim 16 in which the solvent is dimethyl formamide containing 1% by weight of di-n-butylamine.

References Cited in the file of this patent

UNITED STATES PATENTS

| | | |
|---|---|---|
| 2,785,150 | Krieder et al. | Mar. 12, 1957 |
| 2,833,730 | Barthel | May 6, 1958 |
| 2,871,218 | Schollenberger | Jan. 27, 1959 |
| 2,888,413 | Pace | May 26, 1959 |
| 2,902,388 | Szukiewicz | Sept. 1, 1959 |
| 2,921,916 | Harrison et al. | Jan. 19, 1960 |
| 2,955,095 | Gollob | Oct. 4, 1960 |
| 3,016,356 | Pace | Jan. 9, 1962 |